United States Patent
Hua et al.

(10) Patent No.: US 9,967,307 B2
(45) Date of Patent: *May 8, 2018

(54) IMPLEMENTING A HIGH QUALITY VOIP DEVICE

(71) Applicant: ArcSoft (Shanghai) Technology Company, LTD., Shanghai (CN)

(72) Inventors: Yonghong Hua, Shanghai (CN); Zhishan Zhuang, Shanghai (CN); Huagui Zhou, Shanghai (CN)

(73) Assignee: ArcSoft (Shanghai) Technology Company, Ltd., Shanghai (CN)

(*) Notice: Subject to any disclaimer, the term of this patent is extended or adjusted under 35 U.S.C. 154(b) by 0 days. days.

This patent is subject to a terminal disclaimer.

(21) Appl. No.: 14/480,911

(22) Filed: Sep. 9, 2014

(65) Prior Publication Data

US 2014/0376545 A1 Dec. 25, 2014

Related U.S. Application Data

(63) Continuation of application No. 12/921,380, filed as application No. PCT/CN2008/000457 on Mar. 7, 2008, now Pat. No. 8,873,543.

(51) Int. Cl.
H04L 29/06 (2006.01)
(52) U.S. Cl.
CPC .......... *H04L 65/80* (2013.01); *H04L 65/1053* (2013.01)
(58) Field of Classification Search
CPC .................. H04L 65/1053; H04L 65/80
USPC ................. 370/352–356, 94.1, 401
See application file for complete search history.

(56) References Cited

U.S. PATENT DOCUMENTS

| | | | |
|---|---|---|---|
| 6,069,887 A * | 5/2000 | Geiger et al. | 370/338 |
| 6,577,648 B1 * | 6/2003 | Raisanen et al. | 370/503 |
| 7,243,150 B2 * | 7/2007 | Sher et al. | 709/225 |
| 7,567,509 B2 * | 7/2009 | Ortiz | 370/230 |
| 7,729,247 B2 * | 6/2010 | Kim et al. | 370/230 |
| 2002/0101853 A1 * | 8/2002 | Siegrist et al. | 370/352 |
| 2003/0093234 A1 * | 5/2003 | Barford | 702/76 |
| 2003/0117899 A1 * | 6/2003 | Eidson | 368/46 |
| 2004/0073690 A1 * | 4/2004 | Hepworth et al. | 709/230 |
| 2004/0152490 A1 * | 8/2004 | Aoyama et al. | 455/560 |
| 2004/0179474 A1 * | 9/2004 | Usuda et al. | 370/229 |

(Continued)

OTHER PUBLICATIONS

PCT/CN08/00457 Filed Mar. 7, 2008 "International Preliminary Report on Patentability", dated Sep. 16, 2010, 5 pages.

*Primary Examiner* — Khaled Kassim
(74) *Attorney, Agent, or Firm* — Patent Law Group LLP; David C. Hsia

(57) ABSTRACT

A method is provided for Voice over Internet Protocol (VoIP) devices to communicate over an Internet Protocol (IP) network. The method includes synchronizing the VoIP devices using one or more dual-tone multi-frequency (DTMF) codes over a telephone network, retransmissions of voice packets in bursts, retransmissions of voice packets following a time lag, adjusting the number of retransmissions based on quality of service, retransmission of a missing voice packet identified in a list received from a peer device, discarding low energy voice frames in a jitter buffer to prevent overflow, stopping playout at a low energy voice frame when the jitter buffer is below a minimum buffer size, and selective transmission and retransmission of voice packets based on their energy levels.

19 Claims, 9 Drawing Sheets

(56) References Cited

U.S. PATENT DOCUMENTS

| | | |
|---|---|---|
| 2005/0207342 A1* | 9/2005 | Tanabe et al. ............... 370/235 |
| 2006/0083220 A1* | 4/2006 | Mekala et al. ............... 370/352 |
| 2006/0268713 A1* | 11/2006 | Lundstrom .................. 370/235 |
| 2008/0031283 A1* | 2/2008 | Curran-Gray et al. ....... 370/503 |
| 2008/0192623 A1* | 8/2008 | Chen ............................ 370/212 |
| 2010/0322231 A1* | 12/2010 | Kuo ............................. 370/352 |

* cited by examiner

IMPLEMENTING A HIGH QUALITY VOIP DEVICE

CROSS REFERENCE TO RELATED APPLICATIONS

This application is a Continuation of U.S. application Ser. No. 12/921,380, now U.S. Pat. No. 8,873,543, entitled "Implementing a High Quality VOIP Device," which is a 371 application of International Application No. PCT/CN08/00457 filed Mar. 7, 2008.

This application is related to U.S. application Ser. No. 11/280,688, now U.S. Pat. No. 7,778,261, entitled "Using PSTN to Communicate IP Addresses for Point-to-Point Text, Voice, Video, or Data Communication," which is commonly assigned and incorporated herein by reference, and U.S. application Ser. No. 11/618,741, entitled "Using Second Channel to Communicate IP Address for Point-to-Point Text, Voice, Video, or Data Communication," which is incorporated herein by reference.

FIELD OF INVENTION

This invention relates to Voice over Internet Protocol (VoIP), and more specifically to methods for improving the voice quality of VoIP telephone calls.

DESCRIPTION OF RELATED ART

FIG. 1A illustrates an exemplary Voice over Internet Protocol (VoIP) system 100 disclosed in U.S. patent application Ser. No. 11/280,688, entitled "Using PSTN to Communicate IP Addresses for Point-to-Point Text, Voice, Video, or Data Communication." System 100 includes VoIP devices 104 and 106 connected by a wide area network (WAN) 108 (e.g., the Internet) for exchanging data packets through a network connection. Devices 104 and 106 are also connected by a public switched telephone network (PSTN) 110 to exchange IP addresses to establish the network connection over WAN 108. In some scenarios, device 104 is connected by a local area network (LAN) 107 to WAN 108, and device 106 is connected by LAN 109 to WAN 108.

FIG. 1B illustrates a hardware view of VoIP device 104 in one embodiment of the invention. Device 104 has the form factor of a telephone or a videophone. Device 104 includes a central processing unit (CPU) or digital signal processor (DSP) 202 that executes VoIP software loaded from non-volatile memory 204 to volatile memory 206. CPU 202 uses a network card 208 to access WAN 108. CPU 202 uses a telephone chip 212 to access PSTN 110. Telephone chip 212 includes a modem for generating and receiving signals over PSTN 110. For text, voice, and video communications, CPU 202 may be further connected to peripherals including a display 214, a keypad or keyboard 216, microphone and speaker 218, and a camera 220. Device 106 can be similarly constructed as device 104.

SUMMARY

In one embodiment of the invention, a method is provided for Voice over Internet Protocol (VoIP) devices to communicate over an Internet Protocol (IP) network. The method includes synchronizing the VoIP devices using one or more dual-tone multi-frequency (DTMF) codes over a telephone network, retransmissions of voice packets in bursts, retransmissions of voice packets following a time lag, adjusting the number of retransmissions based on quality of service, retransmission of a missing voice packet identified in a list received from a peer device, discarding low energy voice frames in a jitter buffer to prevent overflow, stopping playout at a low energy voice frame when the jitter buffer is below a minimum buffer size, and selective transmission and retransmission of voice packets based on their energy levels.

BRIEF DESCRIPTION OF THE DRAWINGS

Use of the same reference numbers in different figures indicates similar or identical elements.

DETAILED DESCRIPTION OF THE INVENTION

Problems in Conventional VoIP Systems

Figure 1A:
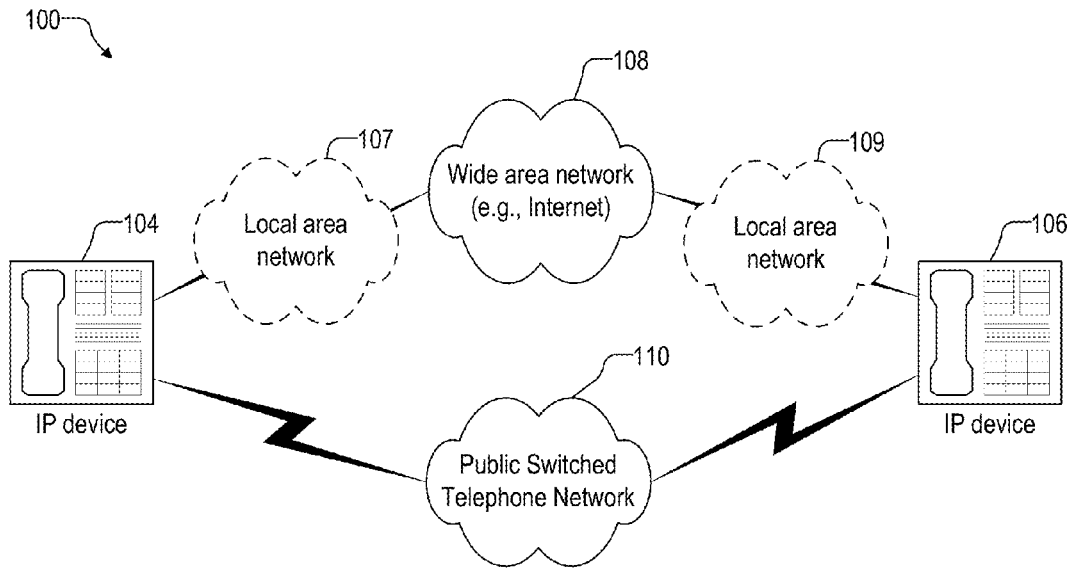
FIG. 1A illustrates a system including two VoIP devices in one embodiment of the invention.
Figure 1B:
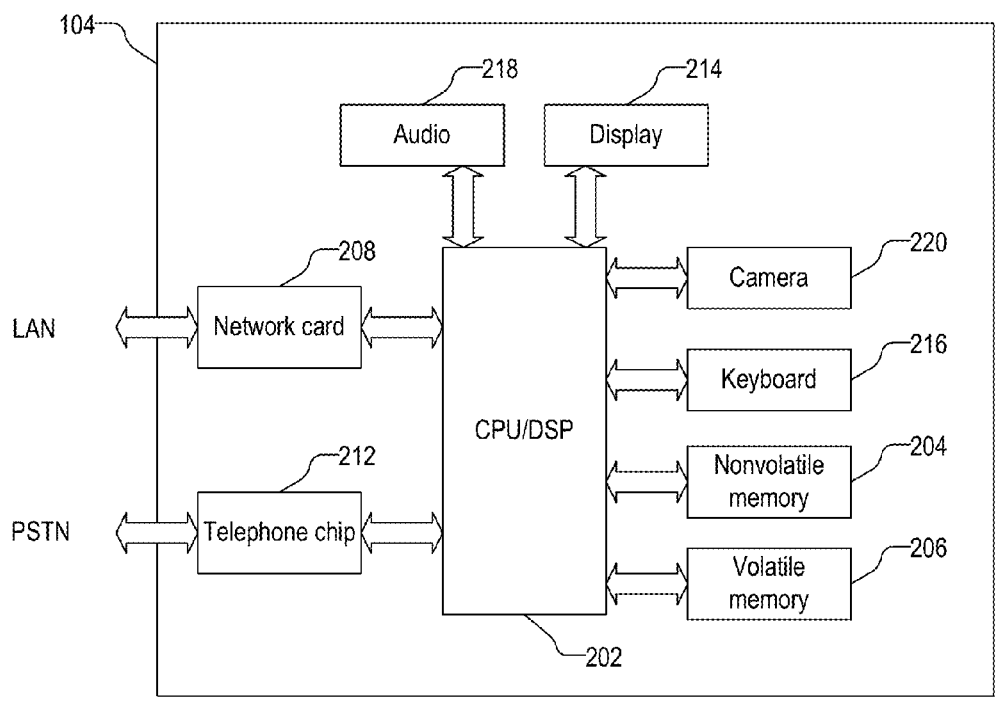
FIG. 1B illustrates hardware in a VoIP device of the system in FIG. 1A in one embodiment of the invention.

When a VoIP device A calls a VoIP device B over a network, the two sides have to synchronize with each other to provide the rhythm of inquiry and reply in human conversation. There are two conventional methods for VoIP devices A and B to synchronize. In the first method, VoIP devices A and B send their local times to each other over the network. However, their local times cannot be precisely synchronized because of network delay. In the second method, VoIP devices A and B request a time from a network time server and send the time to each other. However, their times cannot be precisely synchronized because network delays from the network time server to VoIP devices A and B are different. Without precise synchronization, VoIP devices A and B may play back speech at different times and create a disjointed conversation.

Lost or dropped packets impact voice quality. Lost or dropped packets can be caused by a number of factors, including signal degradation over the network medium, oversaturated network links, corrupted packets rejected in-transit, faulty networking hardware, maligned system drivers or network applications, or normal routing routines. The impact of lost or dropped packets can be mitigated with the use of voice codecs such as the internet Low Bitrate Codec. Nonetheless, the use of voice codecs cannot guarantee voice quality when the packet loss rate is high (e.g., 50%). When this occurs in a low bandwidth network, the lost or dropped packets must be resent.

Using Transmission Control Protocol (TCP) like technology is believed to produce good results. However, it increases network delay and consumes additional bandwidth. Somehow, when additional bandwidth is consumed, the packet loss rate increases and voice quality worsens.

When there is congestion in the network, a VoIP device may delay the transmission of a voice packet. This adds to the overall delay for a voice packet to reach the other VoIP device. To reduce the overall delay, a conventional VoIP system discards some of the voice packets. This causes the users to miss portions of the conversation.

Some VoIP devices can discard voice packets with low power on the receiver side. However, it is difficult to harmonize the various different codecs and transmission protocols. Also, the information on the voice power is not used to improve the transmission of the voice packets.

The present invention seeks to resolve the above problems in conventional VoIP systems. Some embodiments of the invention use the public switched telephone network (PSTN) to synchronize time between VoIP devices. Some embodiments of the invention use retransmission and multiple links to reduce packet loss and delay. Some embodiments of the invention mark the power of the voice data so the receiver does not need to use or support the power detection in the voice codec. Furthermore, this facilitates the receiver to decide whether or not to discard a packet or request for a retransmission of the packet.

Software of VoIP Device

Figure 2A:
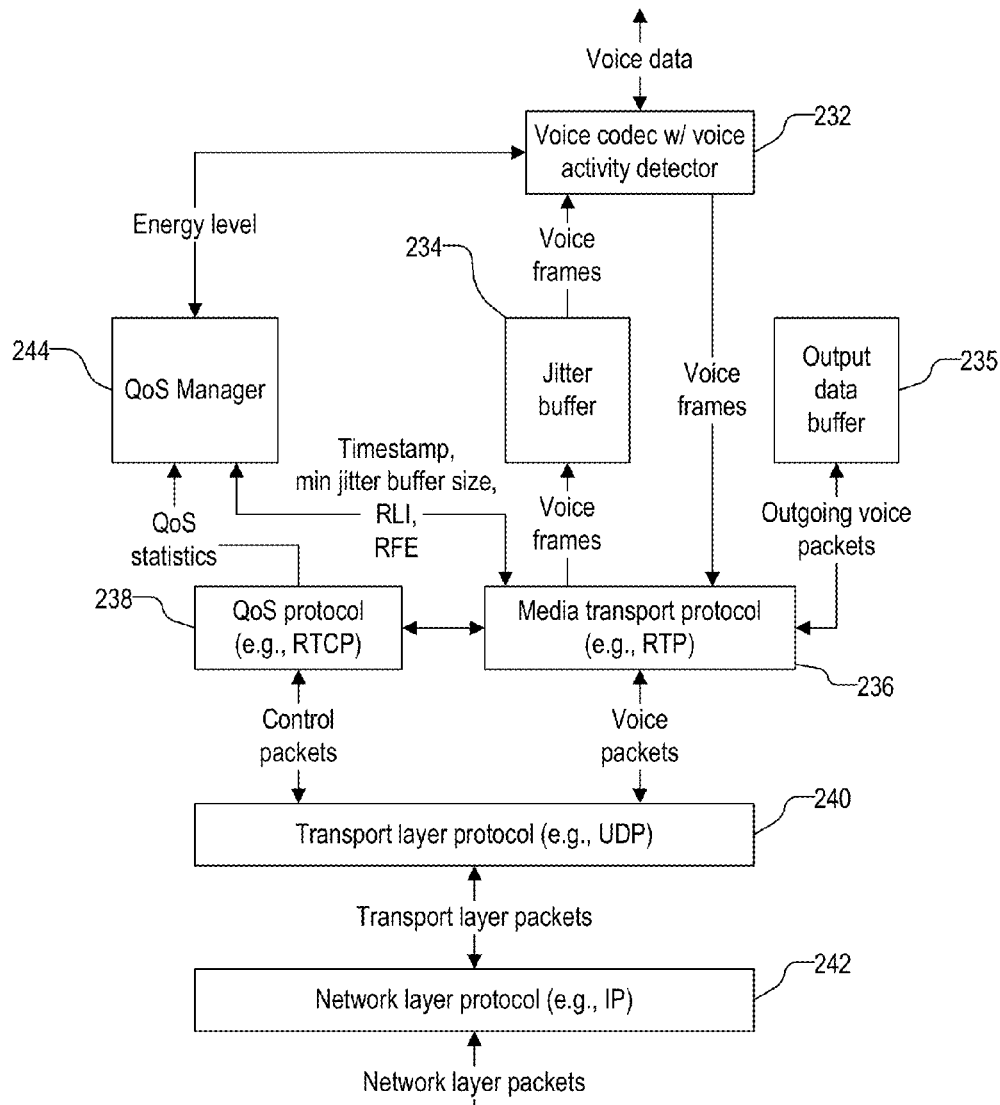
FIG. 2A illustrates software in a VoIP device for improving voice quality in one embodiment of the invention.

FIG. 2A illustrates VoIP software loaded in memory and executed by the processor in a VoIP device in one embodiment of the invention. Alternatively, some of the software modules may be implemented separately by dedicated hardware.

A voice codec 232 compresses outgoing voice data into outgoing voice frames, and decompresses incoming voice frames into incoming voice data. Voice codec 232 includes a voice activity detector (VAD) that detects the energy level of human speech from the incoming voice data.

A jitter buffer 234 temporarily holds the incoming voice frames from the network as they can arrive at irregular intervals from the network. Jitter buffer 234 also reorders the voice frames when necessary as they can arrive out of sequence from the network. To do so, jitter buffer 234 provides slots for each incoming voice frame and the slot is kept empty for late or lost voice frame.

Jitter buffer 234 normally plays out the incoming voice frames at evenly spaced intervals after it fills a minimum number of slots (e.g., 240 milliseconds of slots). This is hereafter referred to as the "minimum jitter buffer size" or simply as the size of the jitter buffer. Jitter buffer 234 discards any additional incoming voice frames after it fills a maximum number of slots (e.g., 2 seconds of slots). This is hereafter referred to as the "maximum jitter buffer size."

A media transport protocol module 236 encodes the outgoing voice frames into outgoing voice packets, and decodes incoming voice packets to form the incoming voice frames. The media transport protocol module 236 also temporarily stores the outgoing voice packets in an output data buffer 235 so they can be retransmitted when needed. Typically output data buffer 235 is the same size as jitter buffer 234.

Figure 2B:
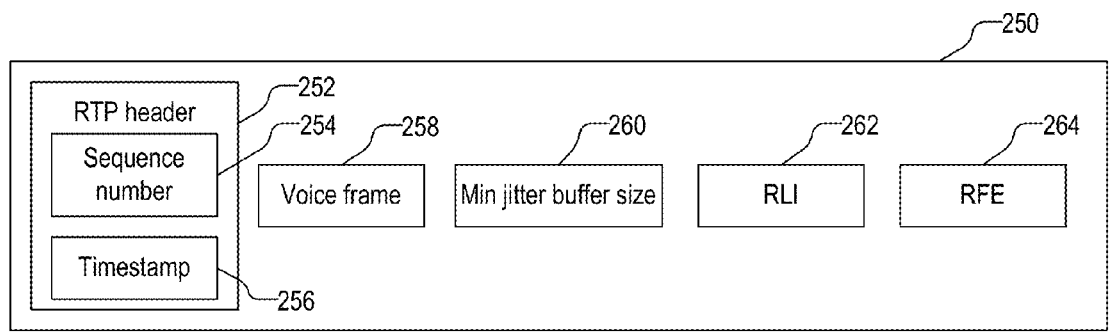
FIG. 2B illustrates a packet sent from a VoIP device to another VoIP device in one embodiment of the invention.

Each voice packet includes a header listing a sequence number and a timestamp, and a payload of one or more voice frames. The sequence number identifies the order in which the voice packets are transmitted, and the timestamp identifies when the voice packets are transmitted. Typically the payload includes two 20 ms voice frames. For the ease of explaining the invention, each voice packet is assumed to carry one 40 ms voice frame. FIG. 2B illustrates an exemplary voice packet 250 that includes a header 252 having a sequence number 254 and a timestamp 256, and a payload of a voice frame 258. In one embodiment, the media transport protocol is the real-time transport protocol (RTP).

Referring back to FIG. 2A, a quality of service (QoS) protocol module 238 monitors media transport protocol module 236 to determine QoS statistics including the number of voice packets sent, the number of lost voice packets, the packet loss rate, and the interarrival jitter (hereafter simply as "jitter"). QoS protocol module 238 periodically transmits outgoing control packets including the QoS statistics to participants of a VoIP telephone call. QoS protocol module 238 also receives incoming control packets from the participants of the VoIP telephone call. In one embodiment, the QoS protocol is the real-time control protocol (RTCP).

A transport layer protocol module 240 encodes the outgoing voice packets and the outgoing control packets into outgoing transport layer packets, and decodes incoming transport layer packets to form the incoming voice packets and the incoming control packets. In one embodiment, the transport layer protocol is the user datagram protocol (UDP).

A network layer protocol module 242 encodes the outgoing transport layer packets into outgoing network layer packets, and decodes incoming network layer packets to form the incoming transport layer packets. In one embodiment, the network layer protocol is the Internet protocol (IP).

A QoS manager 244 controls voice codec 232, jitter buffer 234, output data buffer 235, media transport protocol module 236, and QoS protocol module 238 to implement various methods and steps to improve the voice quality of a VoIP telephone call as described later in detail. Referring to FIG. 2B, QoS manager 244 inserts a minimum jitter buffer size 260, a recent loss index (RLI) list 262, and a recent frame energy (RFE) list 264 of the local VoIP device to each outgoing voice packets 250. The minimum jitter buffer size, the RLI list, and the RFE list are described in detail later. Referring back to FIG. 2A, media transport protocol module 236 also extracts the minimum jitter buffer size, the RLI list, and the RFE list of the remote VoIP device from the incoming voice packets and passes them to QoS manager 244. QoS protocol module 238 extracts the QoS statistics from the incoming control packets and passes them to QoS manager 244.

Time Synchronization

The precision of time synchronization is important to a VoIP system. A shared network cannot guarantee real-time data transmission and delay symmetry in two-way communications. The widely used Network Time Protocol (NTP) synchronization is based on the assumption that the delay in two-way communications is symmetrical. This assumption creates an error that greatly affects the real-time communications procedure, and the extent of the synchronization error directly reflects on the voice quality. To overcome this deficiency, some embodiments of the invention use DTMF time synchronization.

DTMF time synchronization uses the conventional PSTN to send one or a series of DTMF codes to synchronize two VoIP devices. The use of a dedicated line in the PSTN guarantees timely data delivery and delay symmetry in the two-way communications. For DTMF time synchronization, the transmission time of DTMF codes over a telephone line is ignored because it creates a small error. Typically DTMF time synchronization has an accuracy of ±5 ms while synchronization of a shared network has an accuracy of ±50 ms or worse.

DTMF time synchronization is performed by the QoS manager at each VoIP device. In one embodiment, the steps for DTMF time synchronization between two VoIP devices are as follows.

First, the QoS manager at a first VoIP device (hereafter "the first QoS manager") causes the first VoIP device to call a second VoIP device over the PSTN. After connecting with the second VoIP device over the PSTN, the first QoS manager causes the first VoIP device to send one or a series of DTMF codes that signals the start of the synchronization between the two VoIP devices. After transmitting the DTMF codes, the first QoS manager records the current local system time as its synchronization base time "Ts."

Second, the second VoIP device receives the one or the series of DTMF codes that signals the start of the synchronization. After receiving the DTMF codes, the QoS manager in the second VoIP device (hereafter "the second QoS manager") records the current local system time as its synchronization base time Tr.

Third, the first QoS manager keeps a relative synchronization time "Tsr" of the first VoIP device as the difference between the current local system time "Tsc" and its synchronization base time Ts. In other words, Tsr=Tsc−Ts. The first QoS manager provides relative synchronization time Tsr to the media transport protocol module in the first VoIP device, and the media transport protocol module timestamps the outgoing voice packets destined for the second VoIP device with relative synchronization time Tsr. FIG. 2B illustrates header 252 having timestamp 256 with relative synchronization time Tsr.

Fourth, the second QoS manager keeps a relative synchronization time "Trr" of the second VoIP device as the difference between the current local system time "Trc" and its synchronization base time Tr. In other words, Trr=Trc−Tr.

Fifth, the second QoS manager calculates the current network delay "Td" from the first VoIP device to the second VoIP device each time it receives a voice packet from the first VoIP device. The network delay Td is equal to the difference between its relative synchronization time Trr and the relative synchronization time Tsr of the first VoIP device found in the voice packet. In other words, Td=Trr−Tsr. The network delay is used for the real-time retransmission mechanism described later in detail.

Reducing Packet Loss

There are two main issues in real-time voice communication: how to reduce jitter and how to reduce packet loss. To goal is to use the minimum amount of bandwidth to transmit the most important data to control jitter and reduce packet loss. In research and testing, it is determined that reasonable retransmission of a voice packet can effectively address these two issues.

Retransmission increases bandwidth consumption. In order to reasonably use the bandwidth, a variety of retransmission mechanisms is devised. They include burst retransmission, interval retransmission, and real-time retransmission.

Burst Retransmission

Burst retransmission consists of one or more retransmissions of a voice packet in a relative short period of time. This is a simple and effective method because a large and stable data stream can capture more process time from network equipment. Using 1, 2, and 5 ms intervals between transmissions, the burst retransmission is considered uninterrupted and continuous retransmissions. The burst retransmission will not be mistaken as risky data by firewall equipment whereas totally uninterrupted retransmission of a small voice packet using 0 ms interval can easily be deemed as a denial of service attack by firewall equipment. In one embodiment, the voice packet can be retransmitted every 5 ms for a number of times after the initial transmission.

The QoS manager at each VoIP device executes the burst retransmission by causing the media transport protocol module to retransmit the voice packet one or more times. Depending on the network bandwidth, the QoS manager may decide to retransmit only the voice packets of high energy levels (i.e., voice packets that contain audible sounds). Depending on the packet loss rate, the QoS manager may adjust the number of times a voice packet is retransmitted. The methods for these adjustments are described later in detail.

Interval Retransmission

Interval retransmission consists of one or more retransmissions of a voice packet after an initial time lag following the transmission of the voice packet. After testing, it is believed that the interval retransmission can be used to supplement the burst retransmission since it is possible for network equipment to discard consecutive voice packets and thereby resulting in packet loss when burst retransmission is used alone. The initial time lag is application specific and in general it should not be long.

To avoid wasting network resources, the initial time lag should be based on the probability that the slot for a missing voice frame has not been played out when the resent voice frame arrives. To do this, the initial time lag can be adjusted in real-time based on the minimum jitter buffer size, which is based on the current network delay. The initial time lag is longer when the minimum jitter buffer size is large, and the initial time lag is shorter when the minimum jitter buffer size is small.

The QoS manager at each VoIP device executes the interval retransmission. The QoS manager causes the media transport protocol to retransmit the voice packet one or more times after the initial time lag. In one embodiment, the steps for interval retransmission are as follows.

First, the QoS manager at a first VoIP device (hereafter "the first QoS manager") causes the first VoIP device to inform the minimum jitter buffer size "Bs" at the first VoIP device to a second VoIP device. Specifically, the first QoS manager includes minimum jitter buffer size Bs in an outgoing voice packet to the second VoIP device. FIG. 2B illustrates that voice packet 250 includes minimum jitter buffer size 260.

Second, the QoS manager at the second VoIP device (hereafter "the second QoS manager") sets the size "Ar" of an "effective region" of the output data buffer at the second VoIP device based on minimum jitter buffer size Bs at the first VoIP device. The effective region is a time range following the write pointer in the output data buffer. Only voice packets located in the effective region may be retransmitted to the first VoIP device. In one embodiment, the second QoS manager sets effective region size Ar equal to half of minimum jitter buffer size Bs at the first VoIP device. In other words, Ar=Bs/2.

Third, the second QoS manager causes the media transport protocol module at the second VoIP device to retransmit a voice packet one or more times when (1) the initial time lag after has passed and (2) the voice packet is located in the effective region Ar of the output data buffer.

Figure 3:
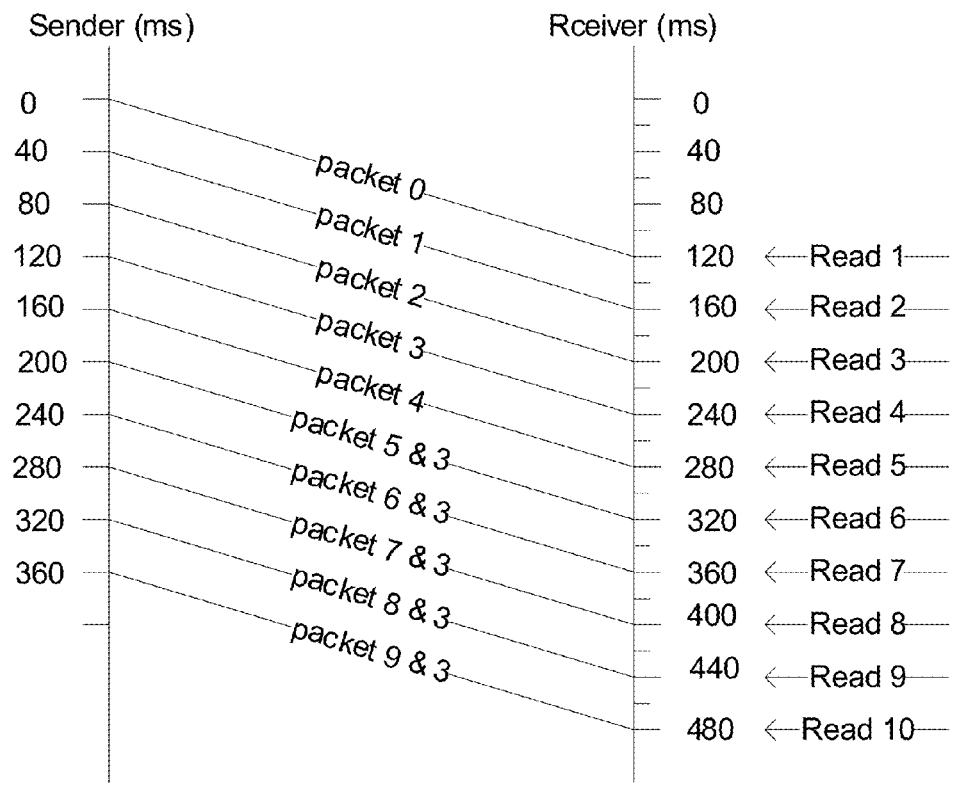
FIG. 3 illustrates burst retransmission of voice packets from one VoIP device to another in one embodiment of the invention.

FIG. 3 illustrates a timing diagram that demonstrates the concept of interval retransmission in one embodiment of the invention. Assume that network delay is 120 ms, the minimum jitter buffer size at the receiver is 240 ms, and the playout rate of the jitter buffer is 40 ms.

It has been determined that the largest initial time lag for the interval retransmission must be less than half of the size of the receiver's jitter buffer. In one embodiment of the invention, the initial time lag for interval retransmission is set to 80 ms. The use of the receiver's jitter buffer provides sufficient time to resend sent packets. In the example of FIG. 3, assume that voice packet 3 is lost and a slot is provided for its voice frame in the jitter buffer.

First, the second VoIP device (hereafter "the sender") sends voice packets 5 and 3 at absolute time 200 ms, and the first VoIP device (hereafter "the receiver") receives voice packets 5 and 3 at absolute time 320 ms. At this time, the jitter buffer has not started to play out because voice packet 0 has only been held 200 ms so the minimum jitter buffer size has not been reached. Thus, the resent voice packet 3 is a valid voice packet.

Second, the sender sends voice packets 6 and 3 at absolute time 240 ms, and receiver receives voice packets 6 and 3 at absolute time 360 ms. At this time, the jitter buffer has started to play out because voice packet 0 has been held 240 ms so the minimum jitter buffer size has been reached. Specifically, the voice frame of voice packet 0 is read out (identified by "read 1"). The resent voice packet 3 is again a valid voice packet because the slot for voice packet 3 in the jitter buffer has not been played out.

Third, the sender sends voice packets 7 and 3 at absolute time 280 ms, and the receiver receives voice packets 7 and 3 at absolute time 400 ms. At this time, the voice frame of voice packet 1 is read out (identified by "read 2"). The resent voice packet 3 is again a valid voice packet because the slot for voice packet 3 in the jitter buffer has not been played out.

Fourth, the sender sends voice packets 8 and 3 at absolute time 320 ms, and the receiver receives voices packets 8 and 3 at absolute time 440 ms. At this time, the voice frame of voice packet 2 is read out (identified by "read 3"). The resent voice packet 3 is again a valid voice packet because the slot for voice packet 3 in the jitter buffer has not been played out.

Fifth, the sender sends voice packets 9 and 3 at absolute time 360 ms, and the receiver receives voice packets 9 and 3 at absolute time 480 ms. At this time, the slot for the voice frame of voice packet 3 is read out (identified by "read 4"). Thus, the resent voice packet 3 is an invalid voice packet because it does not arrive before play out of the slot for the voice frame of voice packet 3.

To prevent unnecessary retransmission of a voice packet, the effective region of the sender's output data buffer is set to ½ of the minimum jitter buffer size at the receiver so that the voice packet would remain in the effective region as long as it can arrive at the jitter buffer in time to be played out. For example, if the effective region of the sender's output data buffer is set to 120 ms, then voice packet 3 would only be retransmitted twice along with voice packet 5 before voice packet 3 is no longer in the effective region of the sender's output data buffer.

Depending on the network bandwidth, the QoS manager may decide to retransmit only the voice packets of high energy levels (i.e., voice packets that contain audible sounds). Depending on the packet loss rate, the QoS manager may adjust the number of times a voice packet is retransmitted. The methods for these adjustments are described later in detail.

Real-Time Retransmission

Real-time retransmission is the retransmission of a voice packet when one VoIP device discovers the other VoIP device has lost the voice packet. It can be used independently or as a supplement to the burst retransmission. Through the real-time retransmission, the speech quality will improve in the shortest possible time. It is suitable for low latency and large jitter networks.

When determining whether or not to increase the number of retransmission for the burst and the interval retransmissions, time (e.g., 5 to 10 s) is needed to assess data reception to avoid unnecessary retransmission caused by occasional and momentary jitter in the network. During this time, the real-time retransmission is very useful. As the real-time retransmission reduces jitter and lost packets, it helps to avoid increasing the number of retransmission. This effectively reduces the bandwidth consumption.

Retransmission of a packet based on a receiver's reception may look similar to the TCP protocol. However, the frequency of the real-time retransmission is much lower than the TCP protocol. Both sides must send voice packets with fixed frequency and record the reception of the incoming voice packets to the outgoing voice packets to achieve a more immediate result.

Real-time retransmission is executed by the QoS manager at each VoIP device. In one embodiment, the steps for the real-time retransmission are as follows.

First, the QoS manager at a first VoIP device (hereafter "the first QoS manager") detects one or more lost incoming voice packets and adds the lost incoming voice packets to a recent loss index (RLI) list that records the lost incoming voice packets in the most recent period (e.g., 640 ms of voice). The first QoS manager detects one or more incoming voice packets have been lost when the voice frame of the current incoming voice packet is placed into its assigned slot in the jitter buffer and there is one or more empty slots before the voice frame in the jitter buffer. The first QoS manager assumes the corresponding incoming voice packets carrying the voice frames destined for the empty slots are lost at this point in time regardless if the incoming voice packets are actually lost or arriving out of order.

Figure 4A:
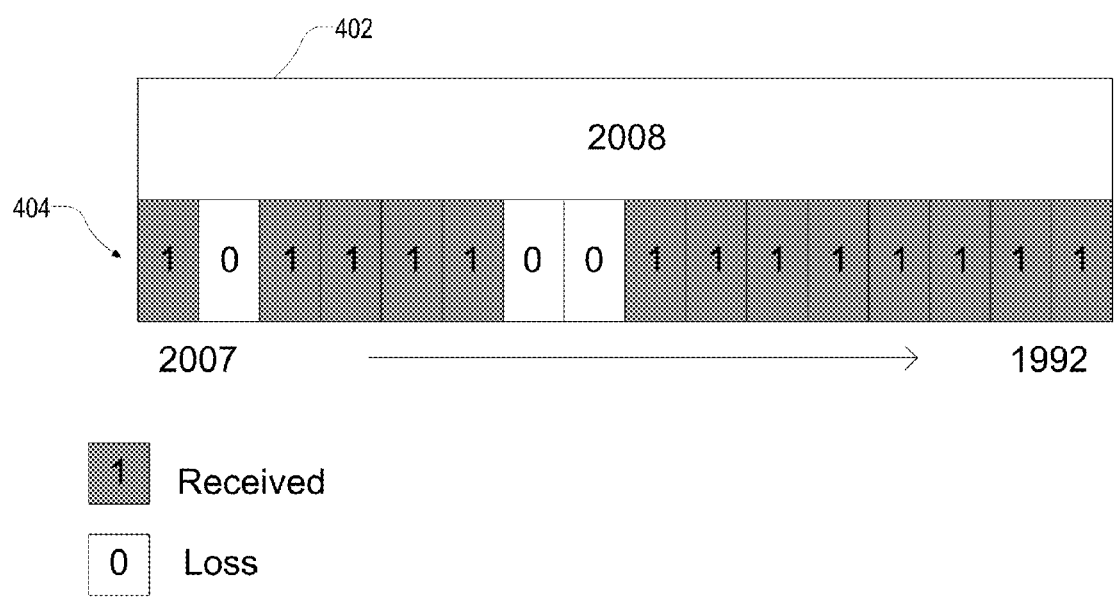
FIG. 4A illustrates a recent loss index (RLI) list of missing voice packets in one embodiment of the invention.

FIG. 4A illustrates a RLI list in once embodiment of the invention. The RLI list includes a first part 402 that stores a sequence number of the last incoming voice packet received (hereafter "based sequence number"). The RLI list includes a second part 404 that stores a string of 1 or 0 bits indicating the received or lost status of the voice packets in the most recent period (e.g., 16 voice packets each comprising 40 ms of voice). For example, part 402 stores a base sequence number of 2008 so part 404 indicates whether or not voice packets 2007 to 1992 have been received or lost.

The first QoS manager adds the first VoIP device's minimum jitter buffer size and the RLI list to a voice packet, and sends the voice packet to the second VoIP device. FIG. 2B illustrates voice packet 250 that includes minimum jitter buffer size 260 and a RLI list 262.

Second, the media transport protocol module at the second VoIP device extracts the minimum jitter buffer size Bs of the first VoIP device and the RLI list from the voice packet, and provides them to the QoS manager at the second VoIP device (hereafter "the second QoS manager"). The second QoS manager analyzes the RLI list to determine the lost voice packets. The second QoS manager then causes the media transport protocol module to resend the lost voice packets to the first VoIP device if the one-way network delay from the first VoIP device to the second VoIP device is less than half of the first VoIP device's minimum jitter buffer size. This assumes the one-way network delay from the first to the second VoIP device is the same as the one-way network delay from the second to the first VoIP device.

Figure 4B:
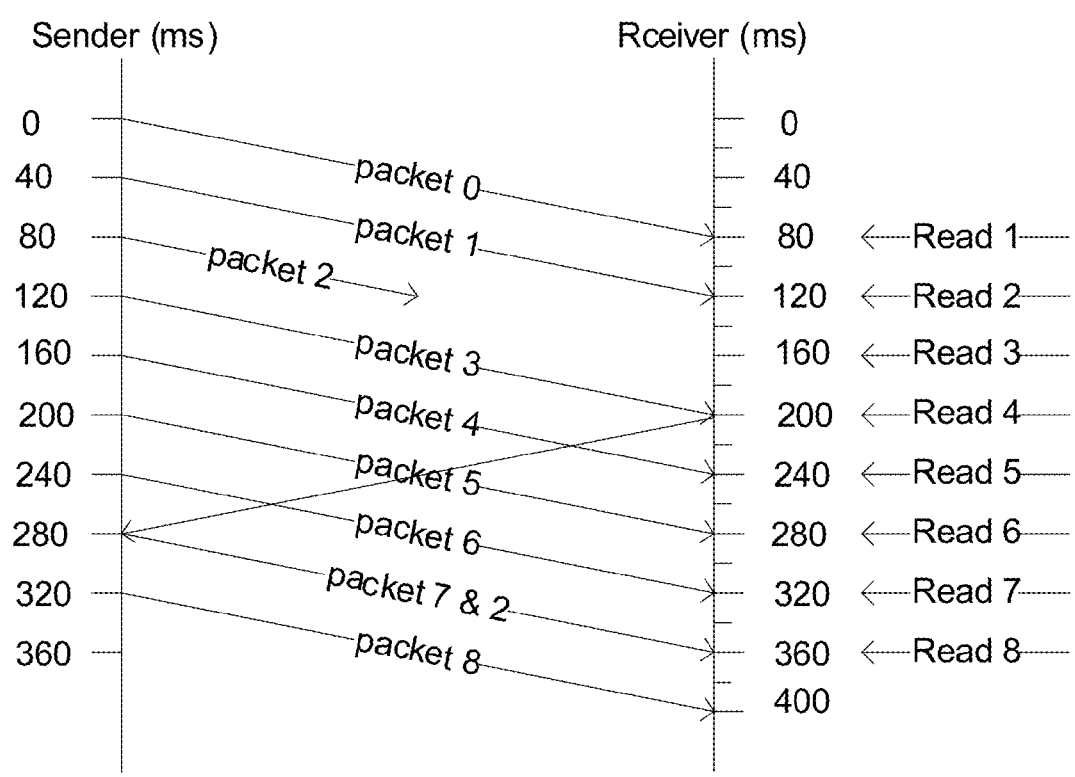
FIG. 4B illustrates interval retransmission of voice packets from one VoIP device to another in one embodiment of the invention.

The effective time for the real-time retransmission depends on the one-way network delay from the receiver to the sender and the receiver's minimum jitter buffer size. Specifically, the one-way network delay from the receiver to the sender must be less than half the size of the receiver's minimum jitter buffer size. The following example in FIG. 4B illustrates this concept.

Assuming the network delay is 80 ms, the receiver's minimum jitter buffer size is 240 ms, and the playout rate of the receiver's jitter buffer is 40 ms. The sender sends voice packet 2 at absolute time 80 ms but voice packet 2 is lost in the network. The receiver records that voice packet 2 has been lost when it sends a packet to the sender at absolute time 200 ms after the receiver receives voice packet 3. In response, the sender resends voice packet 2 along with voice packet 7 at absolute time 280 ms. The receiver receives voice packet 2 at absolute time 360 ms. At this time, the voice frame of voice packet 1 is read out (identified by "read 2"). The resent voice packet 2 is a valid voice packet because the slot for voice packet 2 in the jitter buffer has not been played out.

Voice Frame Energy

Peremptory retransmission of voice packets will rapidly increase the bandwidth consumption, and active indiscriminate dropping of voice packets will create incomplete conversation and decrease voice quality. Thus, the concept of voice frame energy levels is used to determine when to transmit and retransmit a voice frame depending on the network conditions.

Each voice frame is provided with an energy level to indicate its importance. When the energy level of a voice frame is sufficiently low, it can be assumed to indicate a silent state. This feature is helpful to the retransmission mechanisms described above for determining when not to resend low-energy voice frames and when not to play out low-energy voice frames in order to guarantee real-time communication. This feature is also helpful for a low bandwidth management mechanism for determining when not to send low-energy voice frames under low bandwidth conditions.

The QoS manager of each VoIP device creates a recent frame energy (RFE) list that records the energy level of the current voice frame and the energy levels of the voice frames in the most recent period (e.g., 640 ms of voice). The QoS manager receives the energy levels of the voice frames from the voice codec at the VoIP device. The QoS manager then adds the RFE list to the voice packet of the current voice frame being sent to another VoIP device. FIG. 2B illustrates that voice packet 250 includes a RFE list 264. By including the energy levels of the preceding voice frames, the RFE list ensures that the energy level of a lost voice frame is always available.

The voice codec categories the outgoing voice frames into four energy levels: A' for ultra-high energy, B' for high energy, C' for low energy, and D' for ultra-low energy. When a voice packet has multiple voice frames, the voice packet is given the highest energy level of the voice frames.

Avoiding Retransmission of Low-Energy Frames

In the burst retransmission and the interval retransmission, a sender can treat voice frames differently based on their energy levels. Depending on the bandwidth condition, the QoS manager causes the media transport protocol module to retransmit the outgoing voice frames with the appropriate energy level. In one embodiment, the QoS manager categorizes the network bandwidth into four conditions: A for good, B for normal, C for low, and D for very low.

Figure 5A:
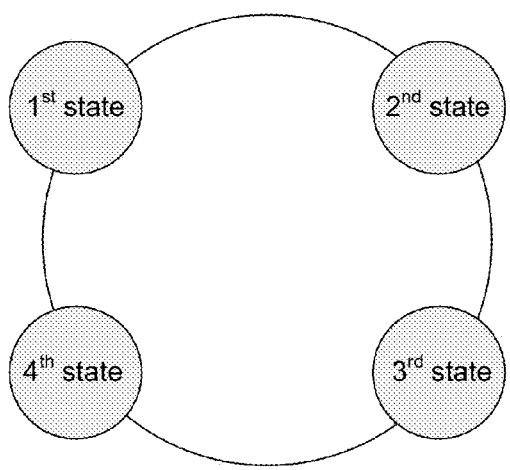
FIG. 5A illustrates one of four states of a VoIP device that corresponds to one of four network bandwidth conditions in one embodiment of the invention.

FIG. 5A illustrates that the QoS manager determines the current bandwidth condition by transitioning from four corresponding states.

In the first state, which corresponds to network bandwidth condition A, the QoS manager increases the number of retransmissions when it detects the packet loss rate is greater than a threshold. The QoS manager increases the number of retransmissions until the packet loss rate worsens or a maximum number of retransmissions is reached. When the packet loss rate worsens, the QoS manager determines if a previous number of retransmissions produced a packet loss rate less than the threshold. If so, the QoS manager reverts to the previous number of retransmissions, remains in the first state, and repeats the above. Otherwise the QoS manager leaves the first state and transitions to the second state. When the maximum number of retransmissions is reached, the QoS manager determines if the packet loss rate is less than the threshold. If so, the QoS manager remains in the first state. Any time the packet loss rate is not less than the threshold, the QoS manager leaves the first state and transitions to the second state.

Figure 5B:
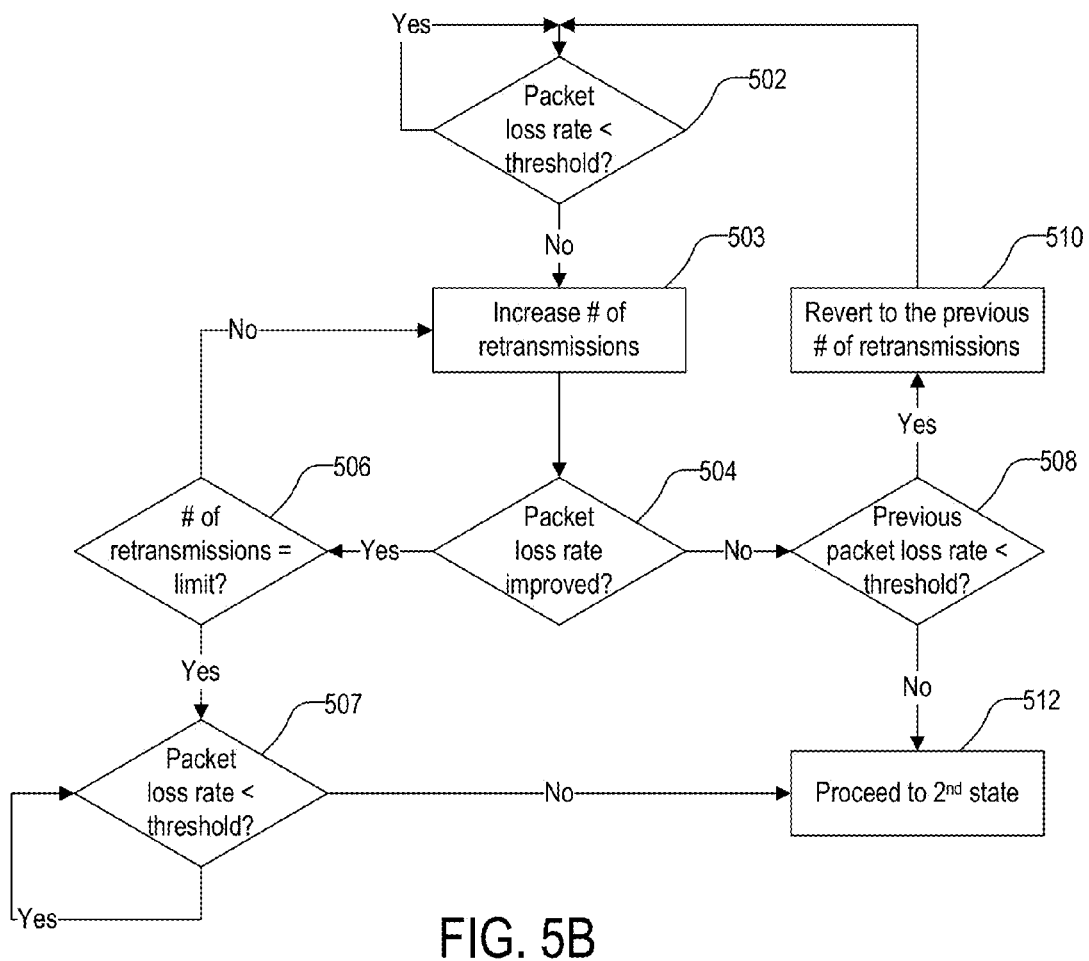
FIGS. 5B, 5C, 5D, and 5E are flowcharts of the steps of the four states of the VoIP device in embodiments of the invention.

FIG. 5B illustrates the steps performed by the QoS manager in the first state in one embodiment of the invention. In step 502, the QoS manager determines if the current packet loss rate is less than the threshold (e.g., 3%). If so, the network bandwidth remains in condition A and step 502 loops onto itself after a predetermined amount of time (e.g., 10 seconds). Otherwise step 502 is followed by step 503.

In step 503, the QoS manager increases the number of burst and interval retransmissions while maintaining the number of link(s) constant between the VoIP devices. Step 503 is followed by step 504.

In step 504, the QoS manager determines if the packet loss rate improves after the predetermined amount of time. If so, then step 504 is followed by step 506. Otherwise step 504 is followed by step 510. Although not illustrated, when any adjustment increases the packet loss rate to greater than 20%, the QoS manager can abandon the current state and proceed to the next state.

In step 506, the QoS manager determines if the maximum number of retransmissions has been reached. If not, then step 506 is followed by step 503 described above. Otherwise step 506 is followed by step 507.

In step 507, the QoS manager determines if the packet loss rate is less than the threshold. If so, the network bandwidth remains under condition A and step 507 loops onto itself after the predetermined amount of time. Otherwise step 507 is followed by step 512 and the QoS manager proceeds to the second state.

In step 508, the QoS manager determines if the packet loss rate from the previous number of retransmissions is less than the threshold. If so, then step 508 is followed by step 510. Otherwise step 508 is followed by step 512 and the QoS manager proceeds to the second state.

In step 510, the QoS manager reverts back to the previous number of retransmissions. Step 510 is followed by step 502 described above.

In the second state, which corresponds to network bandwidth condition B, the QoS manager returns the number of burst and interval retransmissions to a default setting (e.g., two). Alternatively, the QoS manager uses the number of retransmissions that produced the lowest packet loss rate in the first state. The QoS manager then increases the number of links between the VoIP devices until the packet loss rate worsens or a maximum number of links is reached. When the packet loss rate worsens, the QoS manager determines if a previous number of links produced a packet loss rate less than the threshold. If so, the QoS manager reverts to the previous number of links, remains in the second state, and repeats the above. Otherwise the QoS manager leaves the second state and transitions to the third state. When the maximum number of links is reached, the QoS manager determines if the packet loss rate is less than the threshold. If so, the QoS manager remains in the second state. Any time the packet loss rate is not less than the threshold, the QoS manager leaves the second state and transitions to the third state.

Figure 5C:
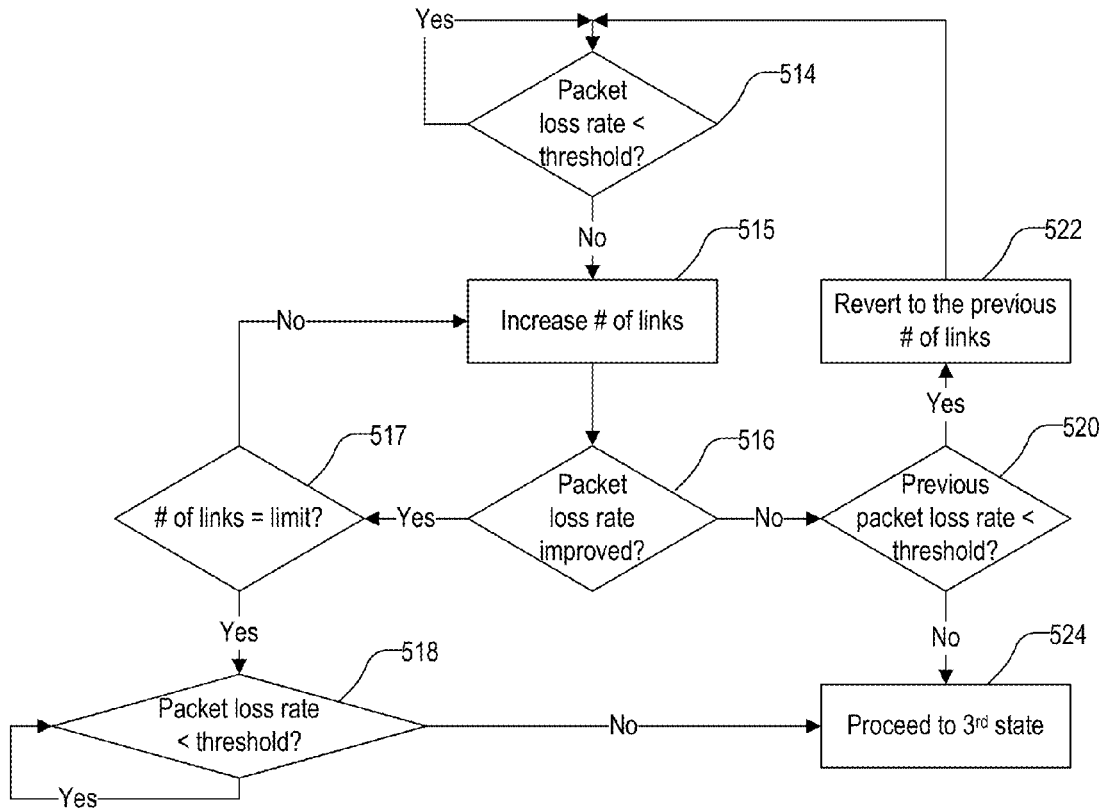

FIG. 5C illustrates the steps performed by the QoS manager in the second state in one embodiment of the invention. In step 514, the QoS manager determines if the current packet loss rate is less than the threshold (e.g., 3%). If so, the network bandwidth remains in condition B and step 514 loops onto itself after a predetermined amount of time (e.g., 10 seconds). Otherwise step 514 is followed by step 515.

In step 515, the QoS manager increases the number of links between the VoIP devices and uses a default number of retransmissions (e.g., two). Alternatively, the QoS manager uses the number of retransmissions that produced the lowest packet loss rate in the first state. Step 515 is followed by step 516.

In step 516, the QoS manager determines if the packet loss rate improves after the predetermined amount of time. If so, then step 516 is followed by step 517. Otherwise step 516 is followed by step 520. Although not illustrated, when any adjustment increases the packet loss rate to greater than 20%, the QoS manager can abandon the current state and proceed to the next state.

In step 517, the QoS manager determines if the maximum number of links has been reached. If not, then step 517 is followed by step 515 described above. Otherwise step 517 is followed by step 518.

In step 518, the QoS manager determines if the packet loss rate is less than the threshold. If so, the network bandwidth remains under condition B and step 518 loops onto itself after the predetermined amount of time. Otherwise step 518 is followed by step 524 and the QoS manager proceeds to the third state.

In step 520, the QoS manager determines if the packet loss rate from the previous number of links is less than the threshold. If so, then step 520 is followed by step 522. Otherwise step 5208 is followed by step 524 and the QoS manager proceeds to the third state.

In step 522, the QoS manager reverts back to the previous number of links. Step 522 is followed by step 514 described above.

In the third state, the QoS manager stops sending ultra-low energy voice frames. The QoS manager then determines it is under network bandwidth condition C when the packet loss rate improves.

Figure 5D:
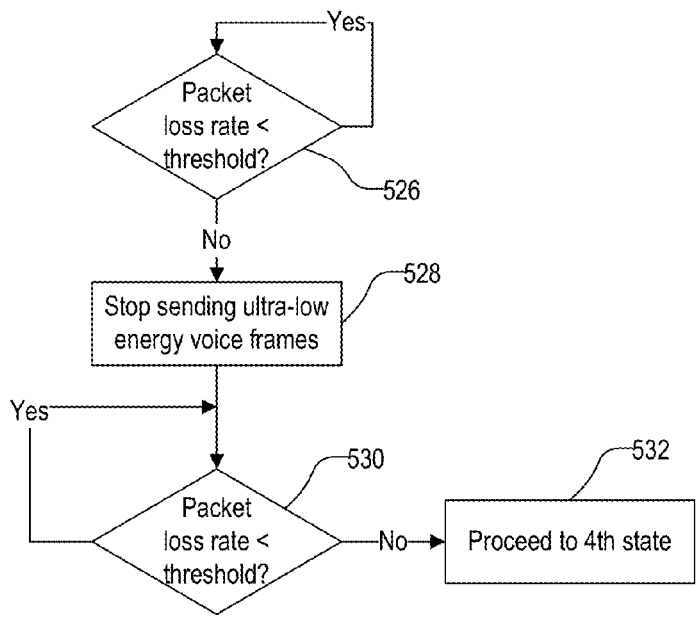

FIG. 5D illustrates the steps performed by the QoS manager in the third state in one embodiment of the invention. In step 526, the QoS manager determines if the current packet loss rate is less than the threshold (e.g., 3%). If so, the network bandwidth remains in condition C and step 514 loops onto itself after a predetermined amount of time (e.g., 10 seconds). Otherwise step 526 is followed by step 528.

In step 528, the QoS manager causes the voice codec to discard ultra-low energy voice frames (i.e., frames with energy level D') instead of providing them to the media transport protocol module for transmission. Step 528 is followed by step 530.

In step 530, the QoS manager determines if the current packet loss rate is less than the threshold. If so, the network bandwidth remains in condition C and step 530 loops onto itself after the predetermined amount of time. Otherwise step 530 is followed by step 532 and the QoS manager proceeds to the fourth state.

In the fourth state, the QoS manager stops sending low and ultra-low energy voice frames. The QoS manager then determines it is under network bandwidth condition D when the packet loss rate improves.

Figure 5E:
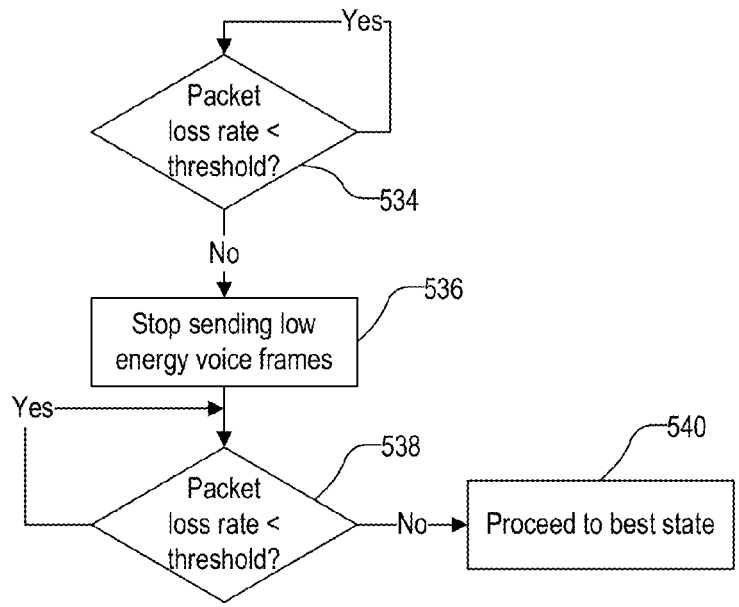
Figure 5F:
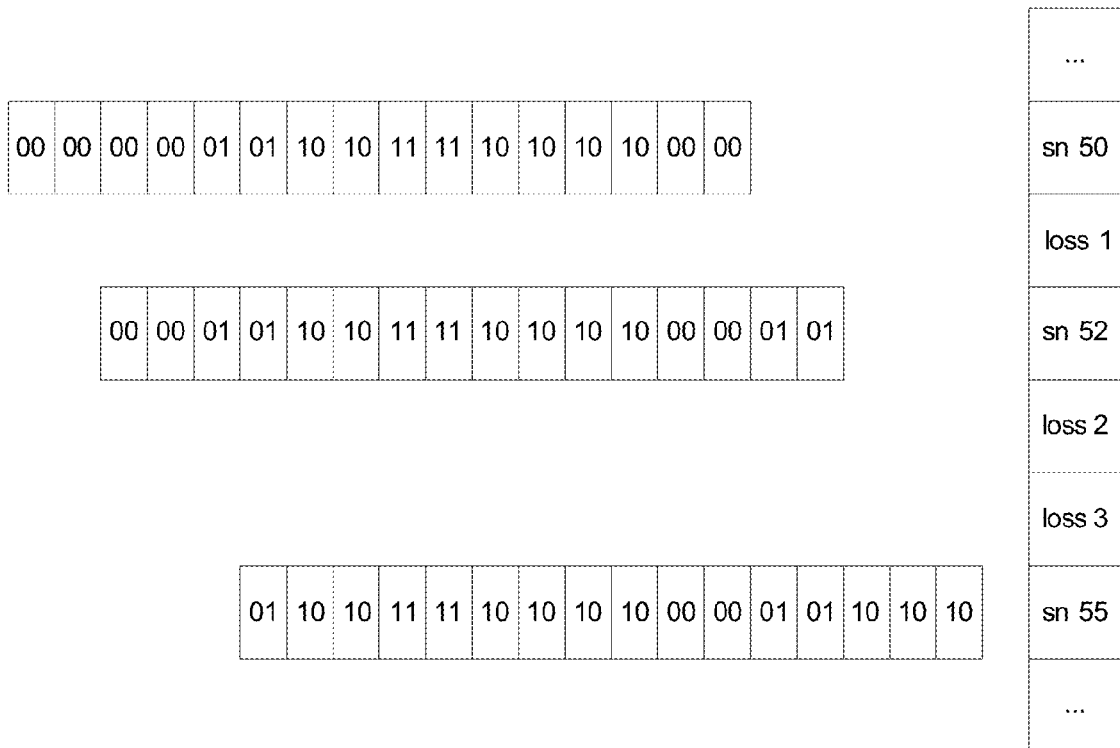
FIG. 5F illustrates recent frame energy (RFE) lists with energy levels of a current voice frame and preceding voice frames for determining retransmission condition and determining wait time for a voice frame in one embodiment of the invention.

FIG. 5E illustrates the steps performed by the QoS manager in the fourth state in one embodiment of the invention. In step 534, the QoS manager determines if the current packet loss rate is less than the threshold (e.g., 3%). If so, the network bandwidth remains in condition D and step 534 loops onto itself after a predetermined amount of time (e.g., 10 seconds). Otherwise step 534 is followed by step 536.

In step 536, the QoS manager causes the voice codec to discard low and ultra-low energy voice frames (i.e., frames with energy levels C' and D') instead of providing them to the media transport protocol module for transmission. Step 536 is followed by step 538.

In step 538, the QoS manager determines if the current packet loss rate is less than the threshold. If so, the network bandwidth remains in condition D and step 538 loops onto itself after the predetermined amount of time. Otherwise step 538 is followed by step 540.

In step 540, the QoS manager proceeds to one of the fourth states that produces the lowest packet loss rate.

After determining the network bandwidth condition, the QoS manager causes the media transport protocol module to retransmit voice packets depending on the energy level of the voice frames in the voice packets. Specifically, the QoS manager causes the transmission of all the voice packets under bandwidth condition A. The QoS manager causes the retransmission of voice packets with energy levels A', B' and C' under bandwidth condition B. The QoS manager causes the retransmission of voice packets with energy levels A' and B' under bandwidth condition C. The QoS manager causes the retransmission of voice packets with energy level A' under bandwidth condition D.

In real-time retransmission, the receiver does not need to tell the sender that it lost ultra-low energy voice frames in the RLI list regardless of the network bandwidth. The receiver plays out an empty frame (hereafter a "silent frame") in place of a lost ultra-low energy voice frame in the jitter buffer.

The voice quality is not affected when a silent frame is played out in place of a lost ultra-low energy frame. Thus, the QoS protocol module does not include lost ultra-low energy frames in the packet loss rate and the number of lost packets regardless of the network bandwidth.

Handling Very Low Bandwidth Conditions

When the system is running in a very low bandwidth environment (i.e., condition D described above), the retransmission mechanisms described above are not used to retransmit low and ultra-low energy voice frames to improve voice quality because the additional data will reduce voice quality. At this time, the transmission of low and ultra-low energy frames is abandoned and the receiver plays out a silent frame in place of a lost low and ultra-low energy frames. In one embodiment, the steps for handling a low bandwidth environment are as follows.

First, the QoS managers at two VoIP devices determine that they are operating in a very low bandwidth environment as described above when the QoS managers transitions to the fourth state.

Second, the QoS manager at a first VoIP device (hereafter "the first QoS manager") causes the first VoIP device to stop sending low and ultra-low energy frames (i.e., voice frames with energy levels C' and D') to a second VoIP device. Specifically, the first QoS manager instructs the voice codec at the first VoIP device to discard the low and the ultra-low energy voice frames instead of providing them to the media transport protocol module at the first VoIP device.

Third, the QoS manager at the second VoIP device (hereafter "the second QoS manager") detects lost voice packets based on the sequence numbers of the received voice packets and determines the energy level of the voice frames in the lost voice packets from the RFE lists in subsequent voice packets. When a lost voice packet has a low or ultra-low energy frame, the second QoS manager plays out a silent frame in the place of the lost low or ultra-low energy frame in the jitter buffer at the second VoIP device and the second QoS manager does not request the first VoIP device to retransmit. As described above, if a voice packet has two voice frames, then the voice packet is treated as to having the energy level of the highest voice frame.

Handling of Minimum Jitter Buffer Crossing

To ensure speech continuity, the jitter buffer only plays out voice frames after the amount of received data is over the minimum jitter buffer size. When the buffered data falls below the minimum jitter buffer size, the jitter buffer stops playout and waits for more voice frames. If the jitter buffer stops after playing out a voice frame with high frequency sound, the listener will experience a very abrupt stop in the conversation. Thus, the energy level of the voice frame can be used to determine when to stop playout and wait for more voice frames. As much as possible, playout is stopped in a region of low-energy frames in the jitter buffer so that the users will not observe any noise. In one embodiment, the steps for handling minimum jitter buffer crossing are as follows.

First, due to network jitter, the jitter buffer in a VoIP device has played down to the minimum jitter buffer size.

Second, the QoS manager of the VoIP device determines the energy level of the previously played out voice frame from the RFE list. If the previously played out voice frame is a high energy frame, then the VoIP device reads the next voice frame in the jitter buffer. If the previously played out voice frame is a low energy frame, then the QoS manager stops the playout of the jitter buffer until it fills beyond the minimum jitter buffer size. In the meantime, the jitter buffer plays out silent frames to the voice codec of the VoIP device.

Third, after continuous high energy frames cause the jitter buffer to empty, the QoS manager stops the playout of the jitter buffer until it fills beyond the minimum jitter buffer size. In the meantime, the jitter buffer plays out silent frames to the voice codec of the VoIP devices.

Improving Real-Time

As the network conditions change, the minimum jitter buffer size needs to be adjusted. The QoS manager decreases the size of the minimum jitter buffer size when the jitter of the incoming voice packets decreases, and vice versa. For example, the QoS manager can adjust the minimum jitter buffer size in a range between 120 to 320 ms depending on the jitter. Note that the maximum jitter buffer size is adjusted by the same amount as the minimum jitter buffer size.

When the minimum jitter buffer size decreases, ultra-low energy frames are actively discarded to catch-up in time (i.e., to prevent overflow of the jitter buffer). Discarding ultra-low energy frames has the smallest impact on voice quality while providing real-time performance. In one embodiment, the steps for improving real-time performance are as follows.

First, the QoS manager of a VoIP device detects the jitter buffer is about to overflow and starts the catch-up process.

Second, the QoS manager selects a catch-up speed to discard a specified amount of voice in the jitter buffer within a catch-up time. The QoS manager typically discards 40 ms of voice within 200 ms of catch-up time under normal conditions. The QoS manager can decrease the catch-up speed by increasing catch-up time when the number of voice frames buffered increases in the jitter buffer or the jitter decreases, and vice versa.

Third, the QoS manager determines the energy levels of the voice frames in the jitter buffer from the RFE list and then causes the jitter buffer to discard the specified amount of ultra-low energy frame within the catch-up time.

Fourth, the QoS manager allows the jitter buffer to play out consecutive higher energy frames until it encounters an ultra-low energy frame. When the QoS manager does not encounter an ultra-low energy frame within 3 or 4 times of the catch-up time, the QoS manager causes the jitter buffer to discard the next voice frame regardless of its energy level Note that catch up will occur when the VoIP device is silent. It can be seen from above that when the VoIP devices use the energy level, it is easy for each VoIP device to transmit the energy level and determine the energy level of a voice frame.

Four bytes (32 bits or 2 bits for each of 16 voice frames) store energy level of the current voice frame and energy levels of the most recent period (e.g., 640 ms) of voice frames. Each frame is categories into one of four energy levels that uses two bits of memory:

(00) ultra-low energy: can be assumed to be silent and never has to be transmitted;

(01) low energy: does not have to be retransmitted in poor network or low bandwidth condition; can be used as a point where the playout of the jitter buffer stops;

(10) high energy: cannot be interrupted under normal conditions and must be retransmitted; and

(11) ultra-high energy: can retransmit in low bandwidth conditions because it can cause incomplete speech and loud noises when lost.

FIG. 5 illustrates the energy symbols in one embodiment of the invention. The jitter buffer receiving the voice frames is illustrated on the right. The RFE lists of the voice frames in the jitter buffer are illustrated on the left, where the right most energy symbol represents the energy level of the corresponding voice frame in the jitter buffer.

Reading RFE List

The jitter buffer shows that frame "loss 1" is not received so its energy level is not known. Thus, the QoS manager looks to the next available frame "sn 52" for the energy level of the preceding lost frame. It can be seen that the right most energy symbol "01" represents the energy level of frame "sn 52," and the preceding energy symbol "01" represents the energy level of frame "loss 1." As frame "loss 1" is a low-energy frame, a silent frame can replace it without requiring a retransmission from the sender. The number of lost packets in each energy level is recorded as part of the QoS statistics. However, the number of lost packets with ultra-low energy frames is not included in the QoS statistics.

Receiver Determining Retransmission

When the VoIP device receives frame "sn 55," the QoS manager discovers that frames "loss 2" and "loss 3" are missing. The energy levels of frames "loss 2" and "loss 3" are retrieved from the next available frame "sn 55." It can be seen that the right most energy symbol "10" represents the energy level of frame "sn 55," and the preceding two energy symbols "10" represents the energy level of frames "loss 2" and "loss 3." As frames "loss 2" and "loss 3" are high energy frames, the QoS manager requests the sender to retransmit "sn 53" and "sn 54" packets in real-time.

Overall Process Flow

Figure 6:
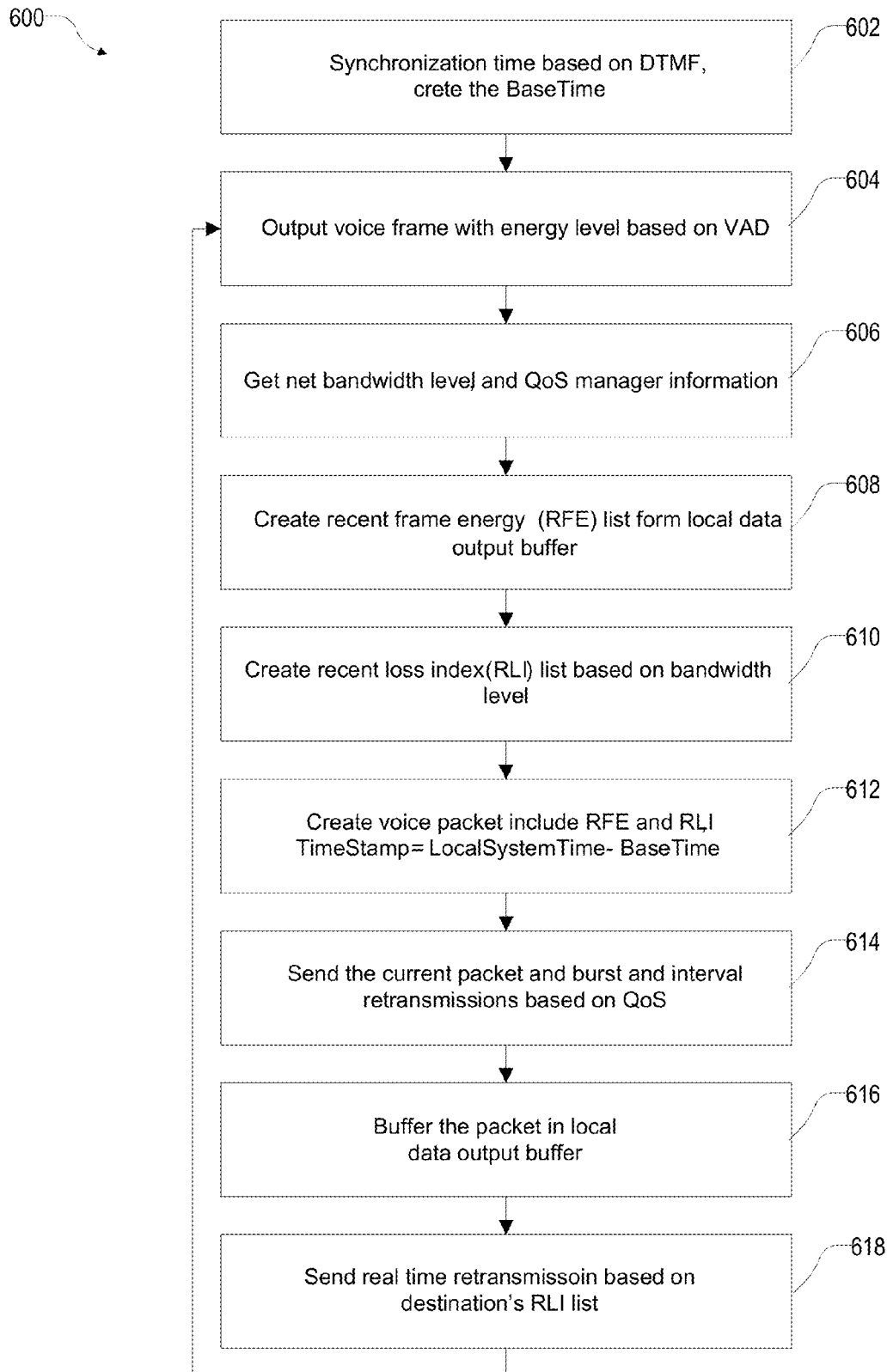
FIG. 6 illustrates a method for a first VoIP device to send voice packets to a second VoIP device in one embodiment of the invention.

FIG. 6 illustrates a method 600 performed by a first VoIP device to send voice packets to a second VoIP device in one embodiment of the invention. Method 600 incorporates the various techniques discussed above.

In step 602, the first VoIP device calls the second VoIP device over the PSTN and transmits one or more DTMF codes that signal the start of the synchronization between the two VoIP devices. After transmitting the DTMF codes, the first VoIP device records the current local system time as its synchronization base time. The first VoIP device also keeps a relative synchronization time, which is equal to the current local system time minus the synchronization base time. Afterwards, the VoIP devices establish a link over the computer network to exchange voice packets.

In step 604, the first VoIP device converts voice data into a voice frame and detects the energy level for the voice frame.

In step 606, the first VoIP device determines the network bandwidth and other QoS information based on the control packets from the second VoIP device. The control packets include QoS statistics such as the number of packets sent, the packet loss rate, and the jitter. Based on the jitter, the first VoIP device makes an adjustment to the minimum jitter buffer size. For example, the minimum jitter buffer size is adjusted every 40 ms. Based on the packet loss rate, the first VoIP device sets the number of burst and interval retransmissions and the number of links between the VoIP devices. Also based on the packet loss rate, the first VoIP device determines the network bandwidth condition.

In step 608, the first VoIP device creates a RFE list that records the energy level of the voice frame created in step 604 and the energy levels of the voice frames in the most recent period (e.g., the preceding 640 ms). The voice frames in the most recent period and their energy levels can be found in the outgoing voice packets stored in the local data output buffer.

In step 610, the first VoIP device creates a RLI list that records lost voice frames that were not received from the second VoIP device. The RLI list is used by the second VoIP device to determine the voice packets to resend in real-time retransmission to the first VoIP device. The first VoIP device does not include lost ultra-low energy frames in the RLI list and uses silent frames in place of the lost ultra-low energy frames in its jitter buffer regardless of network conditions. If the network bandwidth is very low (i.e., condition D), the first VoIP device also does not include lost low energy frames in the RLI list and uses silent frames in place of the lost low energy frames in its jitter buffer.

In step 612, the first VoIP device creates an outgoing voice packet for the voice frame. The voice packet header includes a sequence number and a timestamp of the relative synchronization time at the first VoIP device. The voice packet payload includes the voice frame, the current minimum jitter buffer size, the RFE list, and the RLI list. Depending on the network bandwidth, the first VoIP device may not transmit low and ultra-low energy frames t the second VoIP device.

In step 614, the first VoIP device sends the outgoing voice packet to the second VoIP device, and then resends the outgoing voice packet using the burst and the interval retransmission mechanisms. As described above, the retransmissions of voice packets depend on the energy level of the voice frames in the voice packets and the network bandwidth condition.

In step 616, the first VoIP device buffers the outgoing voice packet in the local output data buffer.

In step 618, the first VoIP device receives an incoming voice packet from the second VoIP device. The voice packet includes (1) the timestamp of the relative synchronization time at the second VoIP device, (2) the current minimum jitter buffer size of the second VoIP device, (3) a RLI list that records the lost voice packets from the first VoIP device, and (4) a RFE list that records the energy levels of the voice packets from the first VoIP device in the most recent period.

The first VoIP device uses the timestamp to determine the one-way network delay from the second VoIP device to the first VoIP device. When the current minimum jitter buffer size of the second VoIP device is more than twice the one-way network delay from the second VoIP device to the first VoIP device, the first VoIP device uses the real-time retransmission mechanism to resend the lost voice packets to the second VoIP device. The first VoIP device also uses the current minimum jitter buffer size of the second VoIP device to update the effective region of the local data output buffer for the interval retransmission in step 614. Step 618 is followed by step 604 for each voice frame.

Figure 7:
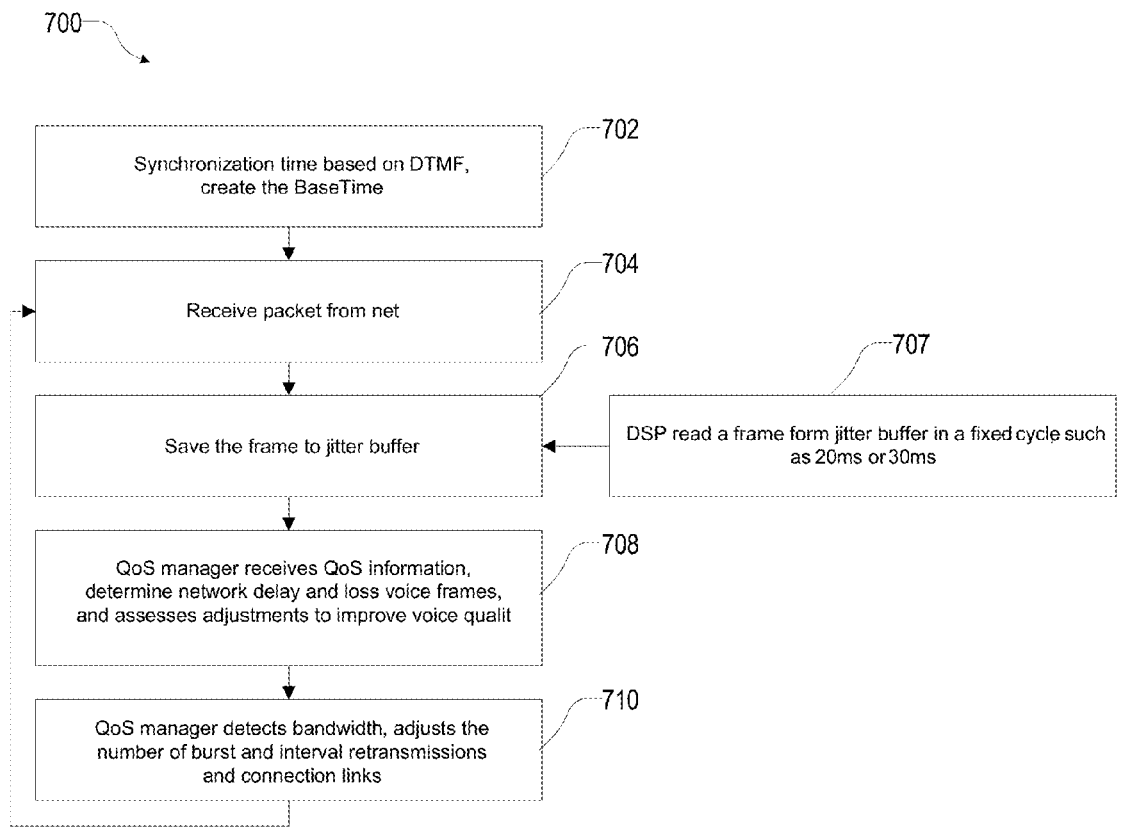
FIG. 7 illustrates a method for the second VoIP device to receive voice packets from the first VoIP device in one embodiment of the invention.

FIG. 7 illustrates a method 700 performed by the second VoIP device receiving a voice packet from the first VoIP device in one embodiment of the invention. Method 700 incorporates the various techniques discussed above.

In step 702, the second VoIP device receives the one or more DTMF codes that signal the start of the synchronization from the first VoIP device and in response records the current local system time as its synchronization base time. The second VoIP device keeps a relative synchronization time, which is equal to the current local system time minus the synchronization base time. This step corresponds to step 602 of the first VoIP device described above.

In step 704, the second VoIP device receives a voice packet from the first VoIP device. This step corresponds to step 614 of the first VoIP device described above.

In step 706, the second VoIP device extracts the voice frame from the voice packet and saves the voice frame to the local jitter buffer.

In step 707, the second VoIP device plays out the voice frames in the local jitter buffer at a fixed rate. As described above, if the jitter buffer is read down to the minimum jitter buffer size, the jitter buffer plays out until an ultra-low energy frame is encountered. Once an ultra-low energy frame is encountered, the jitter buffer stops playout and refills. Furthermore, the second VoIP device can actively discard ultra-low energy frames in the jitter buffer to catch-up in time (i.e., to prevent overflow of the jitter buffer) after the second VoIP device decreases the minimum jitter buffer size.

In step 708, the second VoIP device determines QoS statistics including the number of packets sent, the loss packet rate, and jitter from the voice packet received in step 704. From the lost packet rate, the second VoIP device determines the network bandwidth condition. The second VoIP device also determines the one-way network delay from the first VoIP device to the second VoIP device based on the timestamp in the voice packet received in step 704. The second VoIP device further determines if there are lost voice packets. The second VoIP device leaves off lost ultra-low energy frames off the RLI list and plays out silent frames in place of the lost ultra-low energy frames in the jitter buffer. If the network bandwidth is very low (i.e., condition D), the second VoIP device also leaves off lost ultra-low energy frames off the RLI list and plays out silent frames in place of the lost low energy frames in the jitter buffer.

In step 710, the second VoIP device sends a voice packet to the first VoIP device, and then resends the voice packet using the burst and the interval retransmissions. Based on the jitter, the first VoIP device makes an adjustment to the minimum jitter buffer size. For example, the minimum jitter buffer size is adjusted every 40 ms. Based on the packet loss rate, the first VoIP device sets the number of burst and interval retransmissions and the number of links between the VoIP devices.

Various other adaptations and combinations of features of the embodiments disclosed are within the scope of the invention. Numerous embodiments are encompassed by the following claims.

The invention claimed is:

1. A method for a first Voice over Internet Protocol (VoIP) device to communicate with a second VoIP device over an Internet Protocol (IP) network, comprising:
communicating at least one dual-tone multi-frequency (DTMF) code with the second VoIP device over a telephone network to synchronize time between the first and the second VoIP devices;
recording a local time at the first VoIP device when the first and the second VoIP devices are synchronized by said communicating as a first synchronization base time;
keeping a first synchronization time comprising the local time at the first VoIP device minus the first synchronization base time;
transmitting a first voice packet to the second VoIP device over the IP network, the first voice packet including the first synchronization time when the first voice packet was transmitted;
receiving a second voice packet from the second VoIP device over the IP network, the second voice packet including a second synchronization time when the second voice packet was transmitted from the second VoIP device, the second synchronization time comprising a local time at the second VoIP device minus a second synchronization base time at the second VoIP device, the second synchronization base time comprising the local time at the second VoIP device when the first and the second VoIP devices are synchronized from said communicating; and
determining a network delay as a difference between the first and the second synchronization times.

2. The method of claim 1, further comprising:
after said transmitting, retransmitting the first voice packet a number of times to the second VoIP devices.

3. The method of claim 2, wherein said retransmitting the first voice packet occurs when the first voice packet has an energy level greater than a threshold.

4. The method of claim 3, wherein the threshold depends on a network bandwidth.

5. The method of claim 2, wherein said retransmitting occurs in time intervals of 5 ms or less.

6. The method of claim 2, wherein said retransmitting occurs after a time lag following said transmitting.

7. The method of claim 6, further comprising:
setting a size of an effective region in an output buffer at the first VoIP device, the effective region being a time range following a write pointer in an output buffer; and
storing the first voice packet in the output buffer after said transmitting, wherein said retransmitting occurs only while the first voice packet is in the effective region.

8. The method of claim 7, wherein the second voice packet includes a minimum size of a jitter buffer at the second VoIP device and said setting a size of an effective region comprises setting the size of the effective region equal to half of the minimum size of the jitter buffer.

9. The method of claim 1, further comprising:
determining a missing voice packet from the second VoIP device after placing the second voice packet in a jitter buffer at the first VoIP device;
generating a recent lost index (RLI) list identifying the missing voice packet; and
transmitting a third voice packet to the second VoIP device including the RLI list.

10. The method of claim 9, wherein the RLI list includes a first portion comprising a sequence number of a last received voice packet from the second VoIP device, and a second portion comprising a string of 1 and 0 bits indicating if voice packets preceding the last received voice packet have been received.

11. The method of claim 1, further comprising:
decreasing a size of a jitter buffer at the first VoIP device;
determining energy levels of voice frames in the jitter buffer; and
discarding voice frames with energy levels below a threshold.

12. The method of claim 1, further comprising:
playing out a jitter buffer at the first VoIP device; and
when the jitter buffer is below a minimum buffer size, stopping playout when a last voice frame has an energy level below a threshold.

13. The method of claim 1, further comprising:
determining a missing voice packet not received by the second VoIP device from a recent lost index (RLI) list in the second voice packet; and
retrieving the missing voice packet from an output buffer at the first VoIP device and retransmitting the missing voice packet to the second VoIP device.

14. The method of claim 1, further comprising:
determining energy levels of a voice frame to be included in the first voice packet and voice frames in a recent period of time;
generating a recent frame energy (RFE) list identifying the energy levels of the voice frame to be included in the first voice packet and the voice frames in the recent period of time; and
including the voice frame and the RFE list in the first voice packet.

15. The method of claim 4, further comprising determining the network bandwidth by determining a plurality of states of first VoIP device that corresponds to a plurality of network conditions.

16. The method of claim 15, wherein a first state that corresponds to a first network condition comprises:
increasing a number of said retransmitting until a maximum limit on the number of retransmitting is reached or a packet loss rate of the first VoIP device in the first state stops to improve in response to said increasing a number of said retransmitting;

when the maximum limit on the number of retransmitting is reached, transitioning from the first state to a second state when a current packet loss rate of the first VoIP device in the first state is not less than a loss threshold; and when the packet loss rate stops to improve, transitioning from the first state to the second state when a previous packet loss rate of the first VoIP device in the first state is not less than the loss threshold.

17. The method of claim 16, wherein the second state that corresponds to a second network condition comprises:

increasing a number of links between the first and the second VoIP devices until a maximum limit on the number of links is reached or a packet loss rate of the first VoIP device in the second state stops to improve in response to said increasing a number of links between the first and the second VoIP devices;

when the maximum limit is reached on the number of links, transitioning from the second state to a third state when a current packet loss rate of the first VoIP device in the second state is not less than the loss threshold; and when the packet loss rate stops to improve, transitioning from the second state to the third state when a previous packet loss rate of the first VoIP device in the second state is not less than the loss threshold.

18. The method of claim 17, wherein the third state that corresponds to a third network condition comprises:

stopping transmitting voice packets having an energy level less than a first energy threshold; and transitioning from the third state to a fourth state when a current packet loss rate of the first VoIP device in the third state is not less than the loss threshold.

19. The method of claim 18, wherein the fourth state that corresponds to a fourth network condition comprises:

stopping transmitting voice packets having an energy level less than a second energy threshold; and transitioning from the fourth state to one of the first, the second, the third, and the fourth states having a lowest packet loss rate when a current packet loss rate of the first VoIP device in the fourth state is not less than the loss threshold.

* * * * *